Feb. 7, 1933.   H. HUEBER ET AL   1,897,007
HANGER FOR AUXILIARY WIPER ARMS
Filed Jan. 17, 1930

Inventors
Henry Hueber
Erwin C. Horton
Bartow A. Beaugh
Attorney

Patented Feb. 7, 1933

1,897,007

UNITED STATES PATENT OFFICE

HENRY HUEBER, OF BUFFALO, AND ERWIN C. HORTON, OF HAMBURG, NEW YORK, ASSIGNORS TO TRICO PRODUCTS CORPORATION, OF BUFFALO, NEW YORK

HANGER FOR AUXILIARY WIPER ARMS

Application filed January 17, 1930. Serial No. 421,571.

This invention relates to a hanger or mounting especially adapted for use in pivotally mounting an auxiliary wiper carrying arm for an automatic windshield cleaner of the oscillatory type.

In previous devices of this character provision was not made for the adequate lubrication of the bearing or for conveniently and rigidly mounting it adjacent the windshield. Such hanger is usually exposed to the weather and little thought is ever given the same when lubricating the machine.

An object of this invention is to provide a hanger in which its shaft bearing is maintained well lubricated. The invention further resides in an improved hanger providing for a more facile and protected attachment of the wiper carrying arm.

Figure 1:
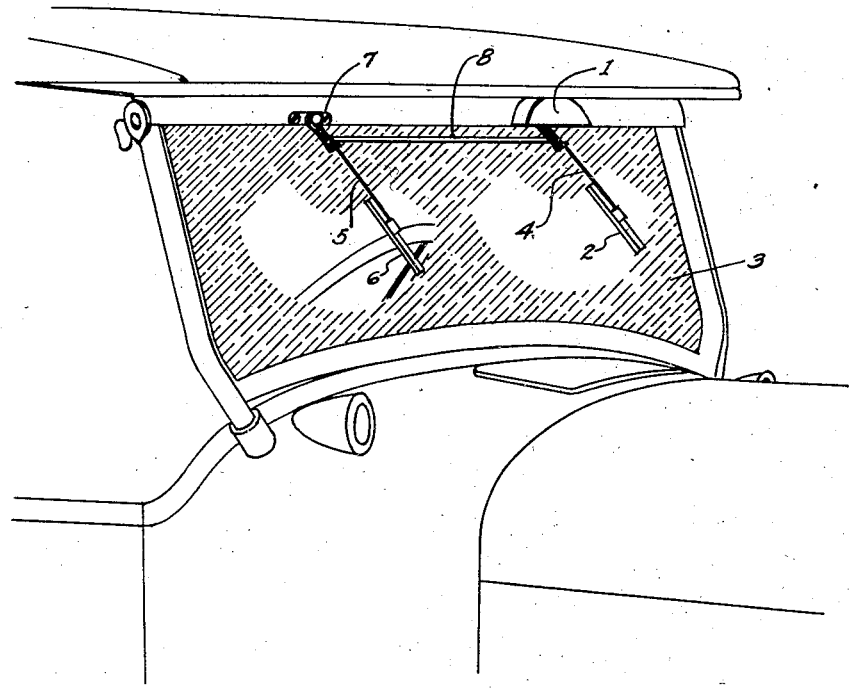
Fig. 1 is a perspective view of the windshield portion of an automobile equipped with a windshield wiper of the oscillatory type and an auxiliary wiper arm mounted in accordance with the present invention.
Figure 4:
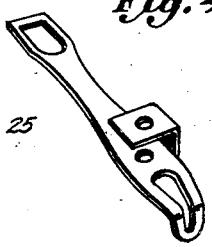
Fig. 4 is a perspective view of the wiper arm stirrup element.

Referring more in detail to the drawing, a suction operated motor 1 is provided to oscillate a wiper blade 2 across the surface of a windshield 3 by means of a wiper carrying arm 4. An auxiliary wiper arm 5, carrying a wiper blade 6 is pivotally mounted upon the bracket 7 to clean another portion of the windshield glass, a link 8 connecting the wiper arms 4 and 5 to cause the auxiliary wiper blade 6 to operate in synchronism with the primary wiper blade 2. The auxiliary wiper arm and connecting link construction above referred to, with the exception of the improved bracket 7 is broadly disclosed by Patent No. 1,768,329 granted June 24, 1930, to John R. Oishei.

Figure 3:
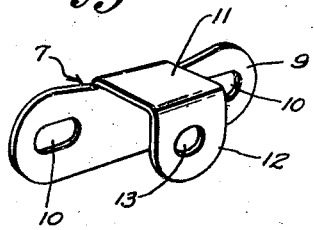
Fig. 3 is a perspective view of the bearing support bracket.
Figure 2:
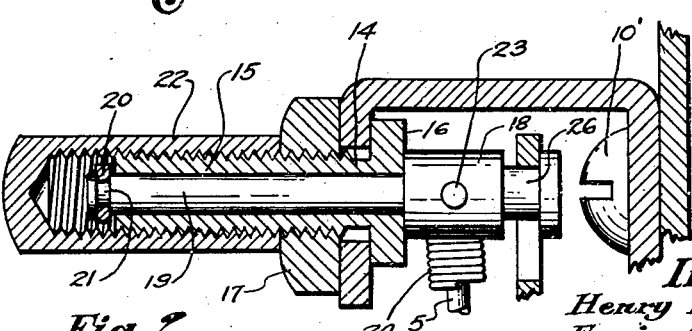
Fig. 2 is a vertical cross section of the auxiliary wiper arm mounting means.

The pivot supporting bracket 7 is more clearly shown in Fig. 3 as comprising an inverted, substantially U-shaped body having a fastening flange 9 with holes 10 for the attaching screws 10', a horizontally extending and overhanging web 11, and a downwardly extending flange 12 having an aperture 13 adapted to receive the pivot bearing or sleeve 14, Fig. 2.

This pivot bearing 14 includes an elongated shank 15, externally threaded, and a head flange or shoulder 16 at one of its ends for seating against the flange 12. The shank 15 is positioned in the aperture 13 from within to seat the shoulder 16 against the inner face of the flange 12, and a nut 17 is engaged with the threaded shank 15 to firmly clamp the flange 12 against the shoulder 16.

The pivot or stub shaft 18 shoulders against the bearing 14 and has a reduced journal portion 19 mounted for free rotation therein. A washer 20 is mounted upon a further reduced portion 21 at the inner protruding end of the shaft to prevent axial displacement of the journal 19 in the bearing 14.

A grease containing reservoir or cap 22 is threaded on or interlocked with the shank 15 in jamming relation with the nut 17 to prevent its loosening. A supply of grease is placed in this reservoir cap before assembly to serve in providing for the proper lubrication of the pivot shaft bearing throughout a long and extended use.

The wiper arm assembly is somewhat similar to that shown in Patent No. 1,674,657 granted to John R. Oishei on June 26, 1928, and comprises a wiper carrying arm 5 (4) formed from a length of wire and having an angular terminal forming a pintle 23, a spring 24 surrounding the arm, and a stirrup 25 for retaining the spring under tension, the stirrup being slipped over the free end of the shaft and engaged in the seat 26 provided therein.

By reason of the spacing web 11, there is provided a compartment for the wiper arm mounting, which web serves as a protective housing for the assembly and prevents undue exposure of the same. It will further be observed that the hanger supports the stub shaft spaced forwardly from off the windshield with its arm-supporting end extending toward the windshield glass in opposition thereto, stopping short thereof so as to permit the proper mounting and attachment of the wiper arm assembly.

While the foregoing specification outlines a particular embodiment of my invention it is to be understood that numerous changes may be made in the size, shape and general arrangement of parts without departing from the spirit of the invention as defined in the appended claims.

What is claimed is:

1. A mounting for pivoting wiper arms, comprising a supporting member having an opening, a bearing member disposed in the opening and having a part seating against one side of the supporting member, said bearing member protruding from the opposite side of said supporting member, a shaft journaled in said bearing member and having a wiper arm supporting portion adjacent said bearing member, means preventing axial displacement of the shaft from its bearing, and means including a lubricant reservoir secured over the protruding end of said bearing member for securing the same to the supporting member.

2. A mounting for wiper arms comprising an inverted U-shaped supporting bracket, a bearing member mounted in one leg of said bracket, a stub shaft journalled in said bearing member with each end projecting therefrom and formed at one end to mount a wiper arm, and means including a lubricant containing cap detachably secured to said bearing member and enclosing the opposite end of said stub shaft and carrying a supply of lubricant for said stub shaft.

3. A hanger for auxiliary wiper arms comprising a bracket having an attaching portion, an overhanging portion and a supporting portion, the latter portion depending from the overhanging portion in opposition to the attaching portion, a wiper carrying shaft journaled in the supporting portion with its wiper carrying end projecting from one side thereof toward the attaching portion and beneath the overhanging portion, the opposite end of the shaft projecting from the opposite side of the supporting portion, and a cap enclosing said opposite end of the shaft.

4. A hanger for auxiliary wiper arms comprising a bracket having an attaching portion, an overhanging portion downturned at its free outer edge to form a depending supporting portion, a shaft journalled in the supporting portion with its wiper carrying end projecting therefrom beneath the overhanging portion, a bearing member secured in the supporting portion and carrying the shaft, means detachably securing the bearing member to said supporting portion, said shaft end terminating short of the attaching portion to permit the attachment of a wiper arm assembly over the end of said shaft, and a lubricant-containing reservoir connected to said bearing member for lubricating the shaft bearing and engaging said detachable means for retaining it against displacement.

5. A hanger for auxiliary wiper arm shafts, comprising a support with an opening therein, a bearing sleeve having a head flange, said sleeve passed through the support opening with its head flange seating against one face of the support, a shaft journalled in the sleeve and projecting from the flange end thereof to support a wiper arm, and a lubricant-containing reservoir interlocked with the sleeve at the opposite face of the support.

6. A mounting for pivoting wiper arms comprising a supporting member, a bearing member extending through said supporting member, a stub shaft journalled in said bearing member with each end projecting therefrom, a wiper arm mounted on one end of said stub shaft and means including a cap secured to said bearing member and enclosing the opposite end of the stub shaft.

HENRY HUEBER.
ERWIN C. HORTON.